Patented July 2, 1935

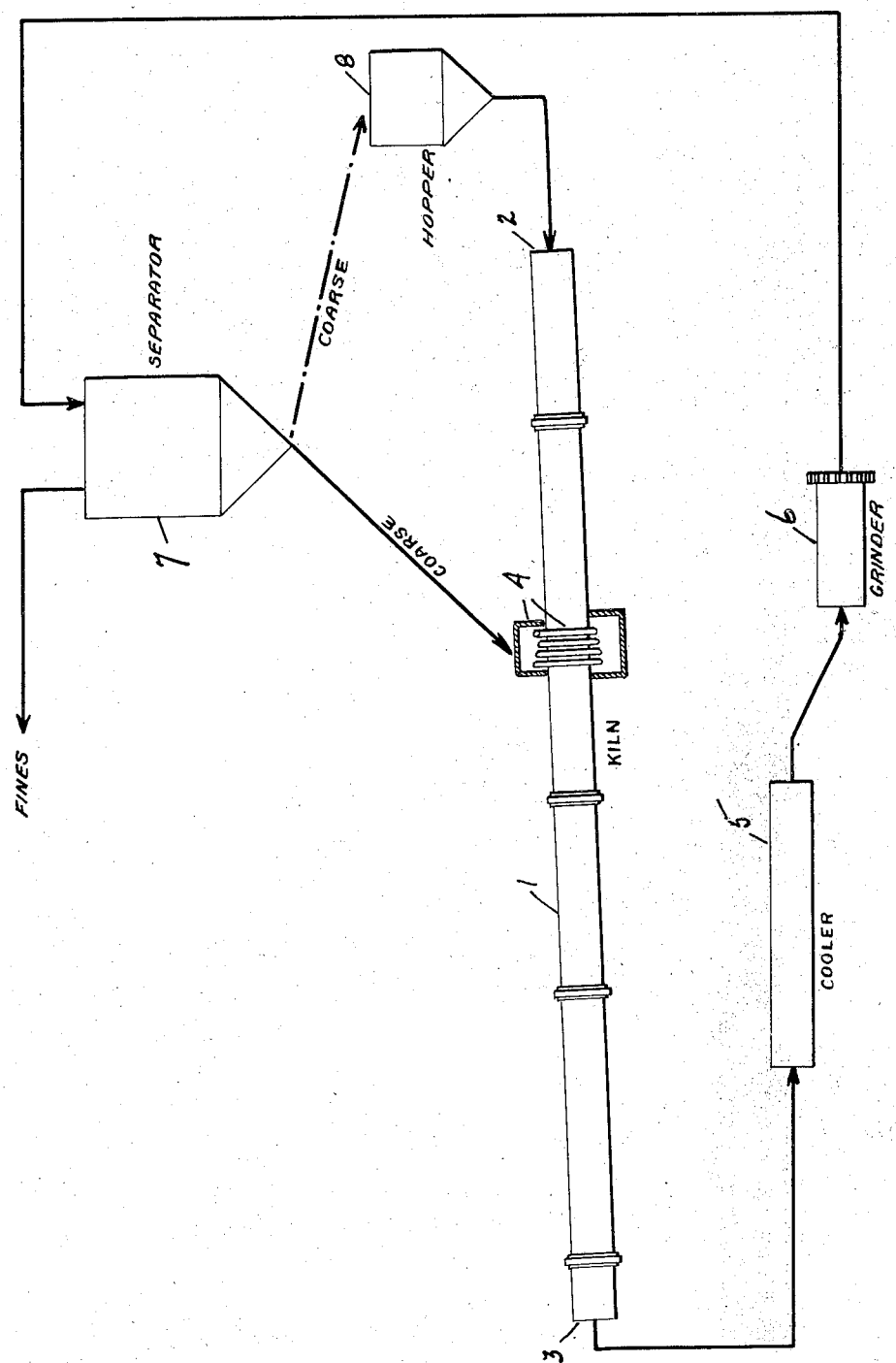

2,006,386

UNITED STATES PATENT OFFICE 2,006,386

MANUFACTURE OF CEMENT

Harvey Randolph Durbin, New Rochelle, and Ejnar Posselt, Pelham, N. Y., assignors to International Cement Corporation, New York, N. Y., a corporation of Maine Application July 1, 1932, Serial No. 620,362

13 Claims. (Cl. 106—25)

This invention relates to improvements in the manufacture of Portland cement.

When a mixture of ground argillaceous and calcareous materials is calcined to the point of incipient fusion, the lime in the calcareous materials reacts with the silica, alumina and iron compounds in the argillaceous materials to produce cementitious ingredients. For one reason or another, however, the reaction between the lime and the other compounds mentioned generally does not go to completion, particularly with respect to the silica, and the result is that instead of the desired tri-calcium silicate there is in the product a substantial proportion of unsaturated di-calcium silicate. Furthermore, as it is not desirable to have an excess of uncombined lime in the cement, the amount of lime employed is ordinarily maintained below safe limits to effect complete combination of the same with the silica, alumina and iron compounds and to avoid an objectionable excess of lime in the product.

In order to provide for more complete saturation, particularly of the silicates in the product, certain proposals have been made. Among these proposals is the suggestion that the mix to be employed for the manufacture of cement be ground to an extremely fine state of subdivision, that is to say, such that about 99 percent will pass a 200 mesh screen. This proposal involves the expenditure of excessive amounts for grinding operations, because not only is the equipment relatively expensive, but the power consumption is increased by about 65 percent over what is required for ordinary grinding.

In the patent to Harvey Randolph Durbin 1,700,032, dated January 22, 1929, there is described a process for manufacturing an improved cement rich in saturated silicates. In accordance with this patent, materials in ground Portland cement clinker are reburned in the presence of lime in excess of that which combines with argillaceous material in a single burning. While excellent results have been secured in the practice of this process, which produces a cement having superior properties, the present invention is an improvement in the practice of that process.

According to the present invention, the improved product of the Durbin patent referred to may be obtained and even improved results secured, as well as additional advantages, by separating ground clinker into relatively fine and relatively coarse particles and reburning only the coarse particles in the presence of lime. In this manner, the cementitious properties of the material constituting the coarse particles may be improved, all without excessive grinding of the clinker which grinding does not, in fact, of itself, appear to produce the desired results, notwithstanding certain theories to the contrary. A more specific feature of the invention resides in separating the coarse particles from ground Portland cement clinker and re-introducing such particles into a kiln while a mix of argillaceous and calcareous materials is being calcined therein, preferably in a continuous manner.

Other objects and advantages of the invention will become apparent as the description proceeds, reference being had to the accompanying drawing, wherein:

The figure is a diagrammatic flow sheet in accordance with one form of the invention.

In manufacturing cement by one process according to the present invention, a mix of argillaceous and calcareous materials from hopper 8 is fed through a kiln 1 from upper end 2 to discharge end 3 and calcined to clinker, which may, if desired, be passed through a cooler 5. The clinker is then ground to a suitable fineness, for example, until 80-90 percent will pass through a 200 mesh screen and fed to a separator 7, preferably of the air flotation type, though a vibrating screen separator or other form may be employed, for segregating the relatively coarse particles of above about 20-60 microns from the fines. These coarse particles may then preferably be mixed with lime and returned to the kiln through a feeder 4, such as is described in the copending application of Durbin and Avnsoe, Ser. No. 583,268, filed December 26, 1931, or other suitable feeder, located intermediate the ends of the kiln, or this mixture of coarse particles and lime may be fed into the kiln through hopper 8.

By proceeding according to the present invention the unsaturated silicates in the cement are converted principally to tri-calcium silicate without the necessity of reburning the whole ground clinker as has previously been the practice. This results in a great saving in heat since only a portion of the clinker need be reburned, and, moreover, the temperatures in the kiln may be materially reduced. Furthermore, upon feeding both the mix and the coarse particles at a steady rate, conditions in the kiln become and may be maintained constant with the result that a uniform product is produced and a continuous process made possible.

As already pointed out, one particular advantage of the present invention resides in the avoidance of excessively fine grinding at any stage in the process. In the present state of the art, a clinker ground to such fineness that 80 to 90 percent passes a 200 mesh screen is considered to be the product of ordinary grinding, and even up to 94 percent passing a 200 mesh screen is generally not considered excessive. Such grinding has been found to give satisfactory results in the practice of the present invention. However, the fineness to which the clinker is ground may vary somewhat in accordance with the proportion of the clinker which it is desirable to reburn.

While a range of 20–60 microns has been indicated as suitable for a dividing line between the coarse and the fines, this line of division may vary depending upon other factors such as the saturation of the cement in the clinker, and on the other hand, particularly good results have been secured where the division is between particles of a diameter larger than 30–40 microns, and the balance of the ground material. Of course, some larger particles may get in with the fines, and vice versa.

As indicating the general proportions of ground clinker which fall within the various sizes, by way of example, one clinker ground to 94 percent passing a 200 mesh screen has been found to contain about 30 percent by weight of the particles smaller than 20 microns in diameter, about 30 percent between 20–40 microns, presumably about half of this 30 percent being between 20–30 and the other half between 30–40 microns, and the balance of the ground material, 35 percent, being coarser than 40 microns. However, these proportions may vary with the constitution of individual products, and the sizes and amounts of the particles to be reburned will vary accordingly.

The fines constitute the finished product and may be mixed, if desired, with a few percent of calcium sulphate.

Although the coarse material which is to be reburned is preferably returned to the kiln, as indicated, through feeder 4, while a mixture of argillaceous and calcareous materials is being fed into the kiln through hopper 8, and although lime for saturating the silica in the coarse particles may be mixed with and preferably ground with the latter before they are reintroduced into kiln through feeder 4, the lime for this purpose might be included in the mix, fed into the kiln at the upper end 2, or, if desired, the coarse particles might be suitably intermingled with ground mix, or ground with the same and introduced into the upper end of the kiln through hopper 8, thus avoiding the need for feeder 4. As another alternative, the mix and coarse particles might either or both be introduced into the kiln partly through the feeder 4 and partly into the end of the kiln. The coarse particles may be reburned with added lime in a separate kiln and may, if desired, be ground to reduce their fineness before they are reintroduced into the kiln, or otherwise reburned. Other devices than kilns might even be employed for the reburning. Nor is the invention in its broadest aspects restricted to the dry process although developed in connection therewith. While the preceding discussion is by no means intended to exhaust all possible variations within the scope of the invention, it is believed to be adequate to suggest such other variation to those skilled in the art.

The total lime employed is advantageously sufficient to react with the alumina, iron and silica in the mix to the extent which is possible in a single burning and substantially to saturate the silicates in the coarse particles, without leaving an undesired excess of lime in the ground clinker produced. When argillaceous limestones are employed as a source of lime, in figuring the amount required allowance should be made for reaction between the calcium oxide and other ingredients of the limestone. Limestones in which the calcium oxide content exceeds the weight of alumina times 1.65 plus the weight of ferric oxide times .35 plus the weight of silica times 2.80, are above the range of even high lime cement mixtures in calcium oxide and suitable as sources of lime.

Where temperatures of about 2400°–2600° F. are employed in the burning zone in the kiln, and the coarse particles are introduced through the feeder 4, the feeder may be located at, say, 10–15 diameters from the lower end of the kiln, or where the temperature is about 1400°–1600° F. These figures are, however, merely by way of example, for even lower temperatures may often yield satisfactory results in connection with the present process.

Where the term "Portland cement" is employed in the specification and claims it intends any clay or other alumino-siliceous material combined with lime by means of a burning operation, and includes products obtained by pulverizing clinker produced by calcining to incipient fusion an intimate and properly proportioned mix of argillaceous and calcareous materials, especially where at least a part of the clinker has been reburned to saturate the silicates. The term "mix" includes mixtures of argillaceous and calcareous materials in which the lime is only sufficient to react with argillaceous materials to the extent possible in a single burning as well as mixtures in which the lime is also sufficient to saturate silicates in the coarse particles. By "lime", as used herein, is meant any compound which furnishes lime on calcination at the temperatures employed.

The terms and expressions which have been employed are used as terms of description and not of limitation, and there is no intention in the use of such terms and expressions, of excluding any equivalents of the features shown and described, or portions thereof, but it is recognized that various modifications are possible within the scope of the invention claimed.

We claim:

1. In the manufacture of Portland cement, steps of burning a mix to produce a clinker, grinding the clinker, separating the relatively fine particles in the ground material from the relatively coarse particles and reburning the coarse particles in the presence of lime.

2. In the manufacture of Portland cement the steps of burning a mix to produce a clinker, grinding the clinker, separating the relatively fine particles from the relatively coarse particles, and reburning the coarse particles in the presence of argillaceous materials and lime sufficient to saturate the silicates in the coarse particles and react with the argillaceous materials substantially to the extent possible in a single burning.

3. The process as claimed in claim 2 in which the burning takes place in a rotary kiln and in which the separated relatively coarse particles are fed into the kiln intermediate the ends thereof and the mix is fed into the kiln at a point further from the burning zone.

4. The process as claimed in claim 2 in which the mix and coarse particles are each fed into a kiln in a continuous manner.

5. In the manufacture of Portland cement the steps of burning a mix to produce a clinker, grinding the clinker to such fineness that about 80 to 94% is capable of passing a 200 mesh screen, separating the relatively fine material from the relatively coarse material, and reburning the relatively coarse particles in the presence of lime.

6. The process as claimed in claim 5, in which the coarse particles constitute about 35% of the weight of ground clinker and are of a size greater than 40 microns in diameter.

7. The process as claimed in claim 5 in which the coarse particles constitute between 65-35% of the ground clinker, and are of a size upwards of 20-40 microns.

8. In the manufacture of Portland cement, the steps of burning a mix of argillaceous and calcareous materials, grinding the clinker produced by the burning, separating the fines from the coarse in the ground material and reburning the coarse in the presence of lime sufficient to substantially saturate the silicates in the coarse particles.

9. The process as claimed in claim 8 in which the clinker is ground to such fineness that about 6-10% is rejected by 200 mesh screen.

10. In the manufacture of Portland cement the steps of burning a mixture of argillaceous and calcareous materials in the presence of unsaturated particles of ground Portland cement clinker to effect substantial saturation of said particles, grinding the clinker thus produced, separating the fines from the coarse, and reburning the coarse.

11. In the manufacture of Portland cement, the steps of introducing into a kiln a mixture of argillaceous and calcareous materials, producing a burning zone in the kiln, feeding the material toward the burning zone, introducing into the kiln at a point nearer the burning zone than the point of introduction of the mix relatively coarse, principally unsaturated particles separated in the last step recited herein, lime being present in amount sufficient substantially to saturate said particles, and the temperature in the burning zone being sufficient to produce calcination of the materials and to produce a Portland cement clinker, grinding the clinker produced, and separating the particles of less than, say, 20 to 60 microns in diameter.

12. In the manufacture of Portland cement, the steps of burning relatively coarse, principally unsaturated particles separated from ground Portland cement clinker, in the presence of lime.

13. In the process of manufacturing Portland cement, the steps which comprise grinding a clinker to such fineness that about 80-94% of the ground material is capable of passing a 200 mesh screen, separating from the ground material the particles which are substantially less than 30 microns in diameter, and reburning at least a portion of the balance of the ground clinker in the presence of lime.

EJNAR POSSELT.
HARVEY RANDOLPH DURBIN.